United States Patent [19]

Kim

[11] Patent Number: 6,028,964
[45] Date of Patent: Feb. 22, 2000

[54] METHOD AND APPARATUS FOR CODING MULTIPLE CONTOURS WITHIN A FRAME

[75] Inventor: Jin-Hun Kim, Seoul, Rep. of Korea

[73] Assignee: Daewoo Electronics Co., Ltd., Seoul, Rep. of Korea

[21] Appl. No.: 08/867,798

[22] Filed: Jun. 3, 1997

[30] Foreign Application Priority Data

Jan. 21, 1997 [KR] Rep. of Korea .................. 97-1560

[51] Int. Cl.[7] ......................................... G06K 9/36
[52] U.S. Cl. ............................................... 382/242
[58] Field of Search .................. 382/232, 233, 382/236, 238, 239, 240, 241, 242, 243, 248, 250; 358/432, 433; 348/384, 394–395, 400–404, 407–416, 420, 421, 425, 430–431, 699

[56] References Cited

U.S. PATENT DOCUMENTS

| | | | |
|---|---|---|---|
| 5,497,435 | 3/1996 | Berger | 382/249 |
| 5,592,228 | 1/1997 | Dachiku et al. | 382/241 |
| 5,598,215 | 1/1997 | Watanabe | 382/242 |
| 5,668,608 | 9/1997 | Lee | 382/241 |
| 5,691,769 | 11/1997 | Kim | 382/241 |
| 5,757,971 | 5/1998 | Kim | 382/241 |
| 5,774,595 | 6/1998 | Kim | 382/241 |
| 5,870,501 | 2/1999 | Kim | 382/241 |

FOREIGN PATENT DOCUMENTS 2147474  5/1985  United Kingdom ........... H04N 1/411

*Primary Examiner*—Jose L. Couso
*Attorney, Agent, or Firm*—Pennie & Edmonds LLP

[57] ABSTRACT

A method for encoding an input image including more than an object is provided, wherein if number of contours in an image frame is less than a predetermined number, all the absolute addresses of the initial vertices of the contours are encoded. However, if the number of the contours are greater than or equal to the predetermined number, the contours are divided into a plurality of groups, wherein if a position of an initial vertex in a group is known, relative displacements of all the other vertices in the group can be represented by dynamic ranges determined by the number of the contours. Thereafter, absolute position information of a first initial vertex in each group is encoded using an escape code which is followed by the horizontal and the vertical absolute addresses of the initial vertex. All the remaining initial vertices are encoded based on their displacements from the previously encoded initial vertex and the dynamic ranges. The escade-coded data and the displacement coded data are provided as the encoded initial vertex data.

20 Claims, 3 Drawing Sheets

METHOD AND APPARATUS FOR CODING
MULTIPLE CONTOURS WITHIN A FRAME

FIELD OF THE INVENTION

The present invention relates to a method and apparatus for contour coding; and more particularly, to a method and apparatus for encoding a multiple number of contours included in a frame.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects and three sets of parameters for defining the motion, the contour and the pixel data of each object are processed through different encoding channels.

In processing a contour of an object, contour information is important for the analysis and the synthesis of the object shape. A classical coding method for representing the contour information is a chain coding method, wherein all the pixel on the contour ("contour pixels") are treated as vertices and coded to represent the contour information. The chain coding method, however, requires a substantial amount of bits for the representation thereof, although the method does not incur any loss in the contour information.

To overcome the drawback, therefore, there have been proposed several methods to encode the contour information such as polygonal approximation and B-spline approximation, wherein selected contour pixels are determined as vertices and the contour is represented based on the vertices. One of the disadvantages in the polygonal approximation is the roughness in the representation of the contour. The B-spline approximation is, on the other hand, capable of representing the contour more precisely: however, it requires a high-order polynomial to reduce the approximation error and results in an increased overall computational complexity of the video encoder.

In encoding the vertex information of a contour, on of the vertices of the contour is determined first as an initial vertex and a relative displacement between each pair of adjacent vertices is computed. The vertex information is then coded based on the absolute position of the initial vertex and the relative displacements for the remaining vertices through the use of, e.g., the so-called locally-adaptive octant-based vertex coding technique (see, "Revised description of S4a: Geometrical Representation Method", International Organization for Standardization ISO/IEC JTC1/SC29/WG11, Coding of Moving Pictures and Audio Information, Shape Coding AHG, 30, Jul., 1996).

According to the conventional contour encoding schemes, therefore, the coding efficiency would be degraded in case there exist a multiple number of contours in a frame since an initial vertex of each contour is represented by using its absolute position within the frame.

SUMMARY OF THE INVENTION

It is, therefore, a primary object of the invention to provide a method and apparatus for further increasing the coding efficiency by encoding the initial vertices using displacements therebetween when there is one or more than one contour in a frame.

In accordance with the present invention, there is provided a method for encoding an image frame including L objects in an input image signal, L being a non-negative integer, comprising the steps of: extracting L contours of the L objects; selecting a set of vertices which fits each contour; determining an initial vertex of each contour in said set of vertices; grouping the L contours into at most L groups of contours according to a predetermined criterion; selecting a first initial vertex among the initial vertices of the contours included in each group of contours; encoding absolute addresses of the first initial vertices of all the groups of contours, the absolute address of a vertex representing position of the vertex in the image frame; encoding displacements of the rest of the initial vertices from the first initial vertex for all the group of contours, wherein a displacement of an initial vertex is calculated with respect to a preceding initial vertex; and rendering the encoded absolute addresses and the displacements as encoded initial vertex data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
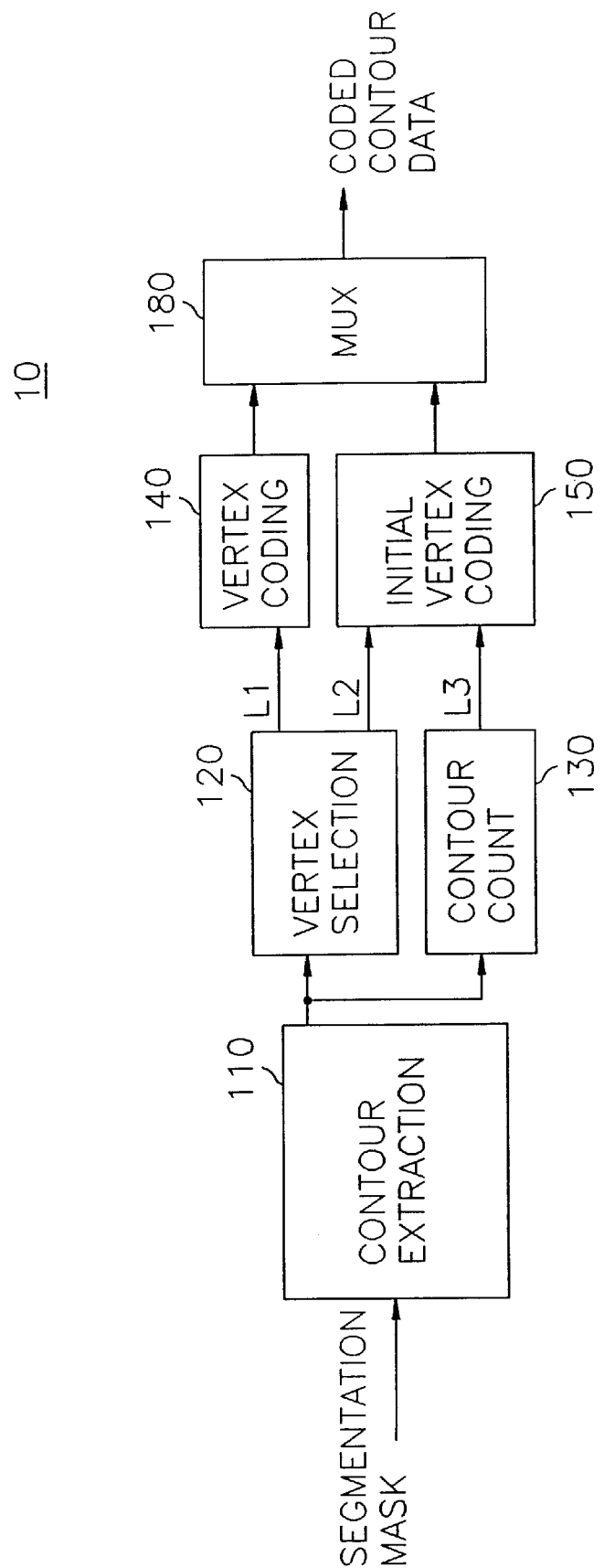
FIG. 1 shows a block diagram of a contour coding apparatus in accordance with a preferred embodiment of the present invention.

Referring to FIG. 1, there is illustrated a block diagram of a contour coding apparatus 10 in accordance with a preferred embodiment of the present invention, which includes a contour extraction block 110, a vertex selection block 120, a contour count block 130, a vertex coding block 140, an initial vertex coding block 150, and a multiplexor (MUX) 180.

A segmentation mask of an input image signal is fed to the contour extraction block 110, wherein the input image includes one or more objects and a background. Each pixel in the segmentation mask has a label identifying the region it belongs to. In a preferred embodiment of the invention, all the pixels constituting the objects("object pixels") have one of binary numbers, e.g., 1 and the pixels corresponding to the background ("background pixels") are represented by the other binary number, e.g., 0. In another instance, the segmentation mask can be constituted such that all the background pixels are represented by zero values and the object pixels in an object have one of non-zero values, e.g., 1, 2, ..., 255, identifying the object. In any case, each object can be easily identified by the label of the pixels in an object.

At the contour extraction block 110, the contour of each object is detected, wherein the contour is made of contour pixels, the contour pixels representing object pixels residing at a boundary of an object. The contours extracted by the contour extraction block 110 are provided to the vertex selection block 120 and the contour count block 130.

The contour count block 130 detects the total number of contours included in the input image by counting the extracted contours inputted thereto from the contour extraction block 110 and provides the number of contours to the initial vertex coding block 150 via a line L3.

The vertex selection block 120 determines vertices on each of the contours through the use, e.g., of a conventional polygonal approximation technique for fitting the contour with a plurality of line segments, wherein a contour segment confined by two vertices disposed adjacent to each other along the contour is represented by a line segment formed by connecting the two vertices. The degree of the polygonal approximation is determined by a characteristic constant Dmax. In the polygonal approximation technique, a distance between each contour pixel on a contour segment and its corresponding line segment is required not to be greater than the constant Dmax. If the Dmax is smaller than one pixel distance, all the contour pixels are selected as vertices.

In addition to selecting the vertices of the contours, the vertex selection block 120 decides an initial vertex for each contour by using a conventional method. For example, a length of each line segment of a contour is calculated and one of the two vertices corresponding to the longest line segment can be set as an initial vertex of that contour. In another instance, direction components, e.g., horizontal and vertical components, of the length of each line segment is computed and one of the two vertices corresponding to the largest direction component may be determined as the initial vertex for a contour.

Outputted from the vertex selection block 120 are position information, i.e., the absolute addresses of the selected vertices for each contour, which are fed to the vertex coding block 140 via a line L1 and those of the initial vertices to the initial vertex coding block 150 via a line L2.

The vertex coding block 140 encodes relative positions of the non-initial vertices i.e., the vertices except the initial vertex for each contour based on a conventional vertex coding scheme, e.g., the locally-adaptive octant-based vertex coding technique, to thereby provide encoded non-initial vertex data to the MUX 180, the relative position of a vertex representing a displacement from a previously coded vertex to the vertex. In case the vertex is the first non-initial vertex of the contour to be coded, a displacement between the initial vertex of the contour and the vertex is coded instead. At the initial vertex coding block 150, the initial vertices are encoded and provided as encoded initial vertex data to the MUX 180.

The MUX 180 combines the encoded initial vertex data and the encoded non-initial vertex data into coded contour data and provides the same to a transmitter(not shown) for the transmission thereof.

Figure 2:
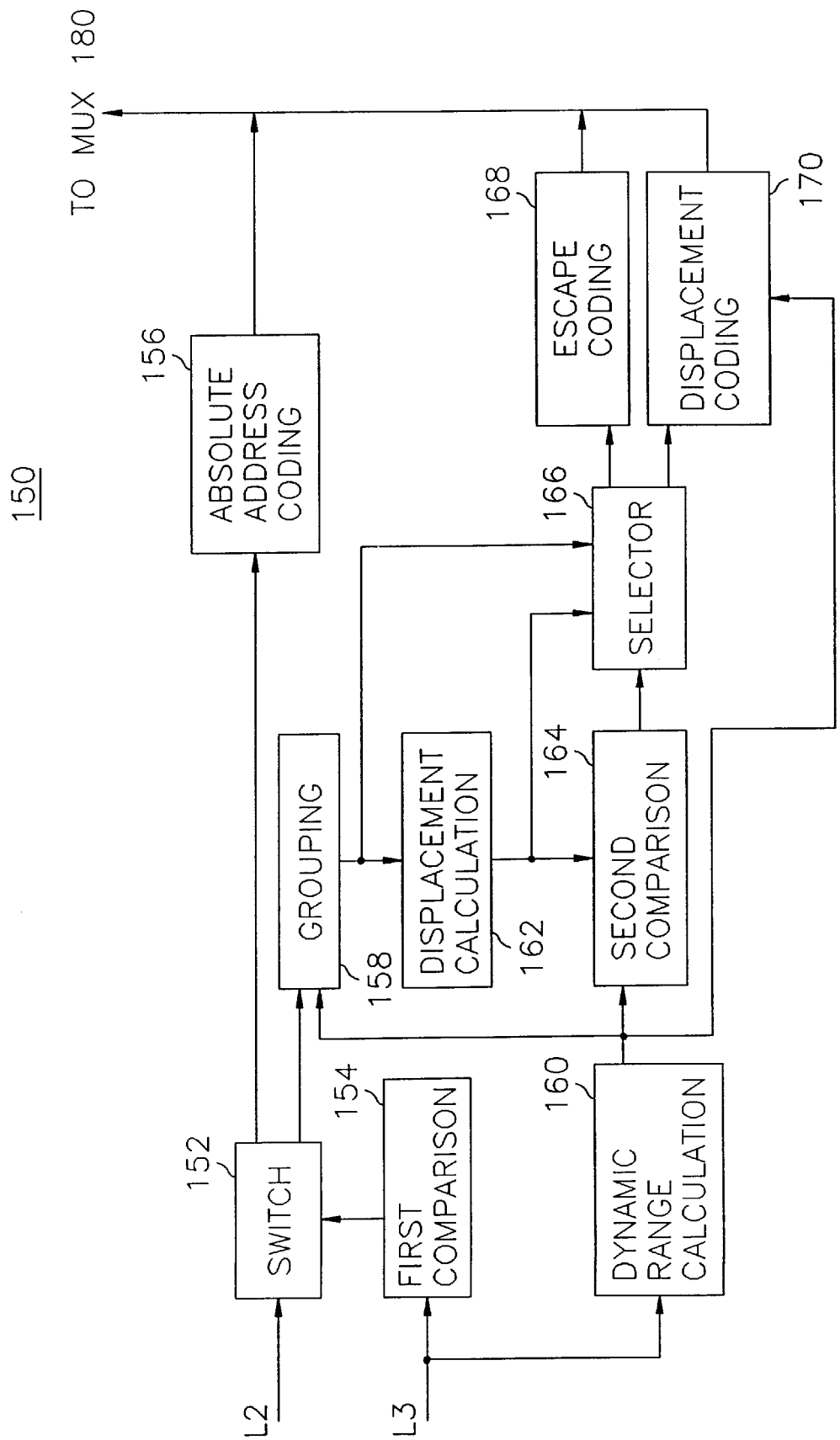
FIG. 2 represents a detailed block diagram of an initial vertex coding block shown in FIG. 1.

Referring to FIG. 2, there are illustrated details of the initial vertex coding block 150, which includes a switch 152, a first comparison block 154, an absolute address coding block 156, a grouping block 158, a dynamic range calculation block 160, a displacement calculation block 162, a second comparison block 164, a selector 166, an escape coding block 168 and a displacement coding block 170.

The number of contours on the line L3 from the contour count block 130 shown in FIG. 1 is fed both to the first comparison block 154 and the dynamic range calculation block 160.

The first comparison block 154 compares the number of contours with a predetermined number. If the number of contours is smaller than the predetermined number, the first comparison block 154 provides a first switching signal to the switch 152 which enables the switch 152 to convey position information for the initial vertices to the absolute address coding block 156. However, if the number of contours is equal to or is larger than the predetermined number, the first comparison block 154 feeds a second switching signal to the switch 152 to transfer position information of the initial vertices to the grouping block 158.

To the switch 152, the position information of the initial vertices selected by the vertex selection block 120 shown in FIG. 1 is inputted via the line L2. The switch 152, based on a switching signal provided thereto from the first comparison block 154, conveys the position information for the initial vertices on L2 either to the absolute address coding block 156 or to the grouping block 158.

In response to the position information of the initial vertices, the absolute address coding block 156 encodes the absolute addresses of the initial vertices and sends the encoded absolute addresses as initial vertex data to the MUX 180 shown in FIG. 1.

Meanwhile, the dynamic range calculation block 160 calculates a horizontal dynamic range and a vertical dynamic range based on the number of contours coupled thereto via the line L3 and provides them to the grouping block 158, the second comparison block 164, and the displacement coding block 170. The horizontal and vertical dynamic ranges, which determine the number of bits required in encoding the initial vertices, is calculated as in the following example.

For the purpose of simplicity, the horizontal and vertical sizes, $FS_H$ and $FS_V$ of the frame, are assumed to be 352 and 240 pixels, respectively. To obtain the horizontal and vertical dynamic ranges, each of the $FS_H$ and the $FS_V$ is divided by the number of contours L first. In a preferred embodiment of the invention, if $FS_H/L$ and $FS_V/L$ are equal to or greater than $2^M$ and $2^N$ but smaller than $2^{M+1}$, and $2^{N+1}$, respectively, the horizontal and the vertical dynamic ranges, $DR_H$ and $DR_V$, are determined as $2^{M+1}-1$ and $2^{N+1}-1$, M and N being non-negative integers. If, for instance, there are 20 contours in a frame, $FS_H/L(=17.6)$ is greater than $2^4$ but smaller than $2^5$; and therefore, M is determined as 4, which gives rise to horizontal dynamic range $DR_H$ of $2^5-1(=31)$.

Likewise, $FS_V/L$ equals to 12 and, therefore, the vertical dynamic range $DR_V$ for the frame including 20 contours is determined to be $2^4-1(=15)$.

In such an instance, a horizontal and a vertical dynamic range bits indicating bits needed in representing respective dynamic ranges are determined as M+1=5 and N+1=4 and fed to the displacement coding block 170.

Figure 3:
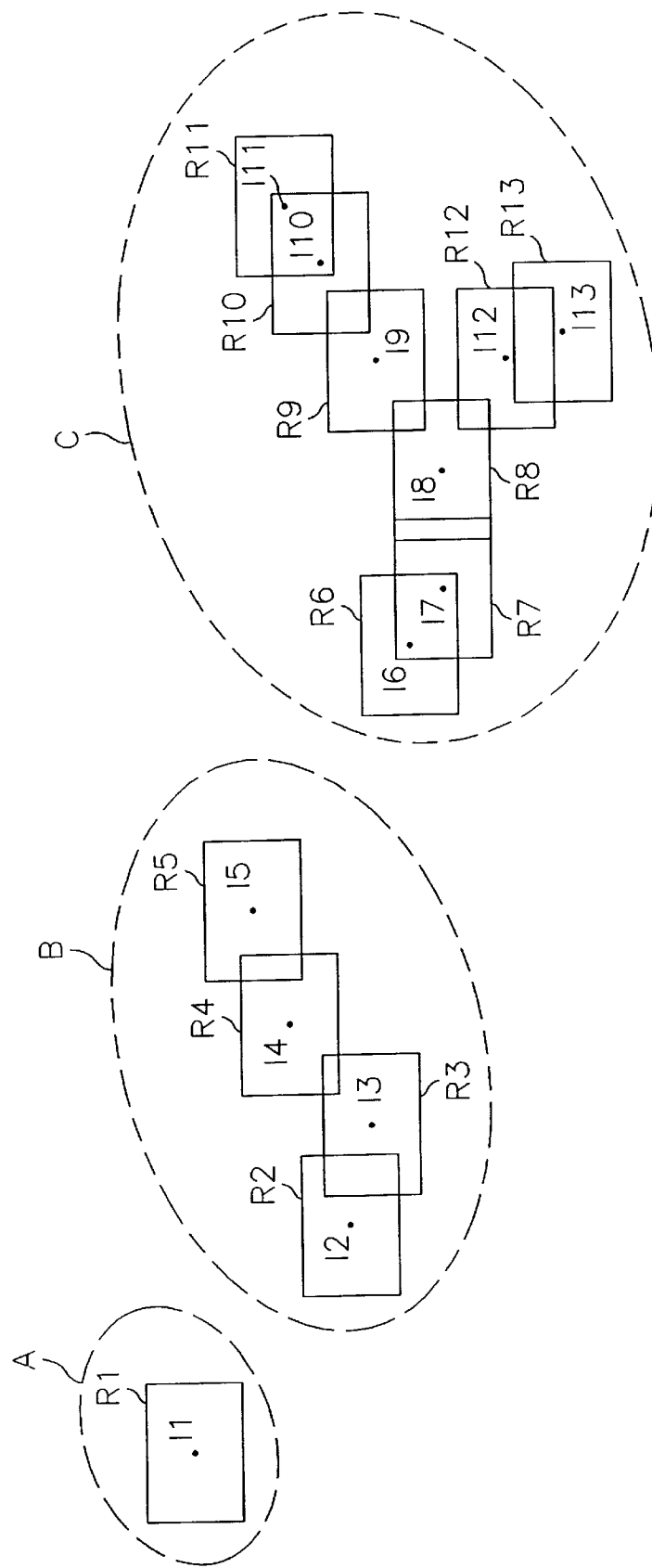
FIG. 3 illustrates initial vertices within a frame to be encoded by the initial vertex coding block in FIG. 2.

At the grouping block 158, the initial vertices of the contours within the image are divided into one or more groups depending on the displacements therebetween. With reference to FIG. 3, there is illustrated a grouping process carried out at the grouping block 158, wherein exemplary initial vertices, I1 to I13, are grouped into three groups A, B, and C. First of all, based on the position information of the initial vertices from the switch 152 and the horizontal and the vertical dynamic ranges from the dynamic range calculation block 160, the grouping block 158 determines a dynamic region for each initial vertex by forming a rectangle whose central point coincides with the initial vertex itself and whose horizontal and vertical lengths equal to the horizontal and vertical dynamic ranges, respectively. For the initial vertices I1 to I13 of FIG. 3, respective dynamic regions R1 to R13 are determined next. After deciding the dynamic regions of each initial vertex, the initial vertices whose dynamic regions overlap or are contiguous to one another are set as a group, wherein the two of the dynamic regions in a group form one overlapped region and none of the dynamic regions in a group overlap with any dynamic region of an initial vertex belonging to another group. In FIG. 3, the initial vertices I1 to I13 are grouped into three different groups A to C consisting of one or more initial vertices I1, I2 to I5, and I6 to I13, respectively. Each initial vertex in a group having more than one initial vertex therein is coupled to at least one initial vertex via dynamic regions. For instance, I2 and I5 in the group B and I6, I11 and I13 in the group C have only one neighboring initial vertex, respectively; I8 in the group C has three neighboring initial vertices I7, I9 and I12, and each of the remaining vertices in the groups B and C has two neighboring initial vertices. Further, the horizontal and the vertical components of the displacement between a pair of initial vertices which have overlapping or contiguous dynamic regions are not greater than the horizontal and vertical dynamic ranges, respectively.

Position information data of the initial vertices are then outputted one at a time to the displacement calculation block 162 and the selector 166 on a group-by-group basis. Since the order of groups is not fixed, if, e.g., group A is outputted first, then any one of the groups B or C can be selected to be outputted next. It should be noted, however, that the initial vertices in a group are outputted starting from one of the initial vertices, e.g., I2 or I5 in the group B, which has only one neighboring vertex, and sequentially in an order of coupling each other. For instance, the vertices I2, I3, I4, and I5 in the group B are provided in that particular order or in a reversed order, i.e., I5 to I2. If a group includes a branch vertex, e.g., I8 in the group C, having more than two neighboring initial vertices, vertices of one branch, e.g., I6 to I11, are outputted first in that order, and then vertices of another branch, such as I13, and I12 are outputted in that order.

The displacement calculation block 162 calculates the horizontal and the vertical displacements between two initial vertices inputted thereto consecutively. When $ADD_H(i)$ and $ADD_V(i)$ are the horizontal and vertical addresses of the i-th initial vertex inputted thereto from the grouping block 158, and an i-th horizontal and vertical displacement $D_H(i)$ and $D_V(i)$ may be defined as:

$$D_H(i)=ADD_H(i)-ADD_H(i-1)$$

$$D_V(i)=ADD_V(i)-ADD_V(i-1),$$

wherein i is a positive integer from 1 to L, L being a total number of the initial vertices, and $ADD_H(0)$ and $ADD_V(0)$ are preset initial values having such large values that generate $D_H(1)$ and $D_V(1)$ whose absolute values are greater than any possible horizontal and vertical dynamic ranges.

The calculated horizontal and vertical displacements are fed both to the second comparison block 164 and the selector 166. At the second comparison block 164, for each initial vertex, the absolute values of the $D_H(i)$ and the $D_V(i)$ are compared with the horizontal and vertical dynamic ranges, $DR_H$ and $DR_V$, respectively. If the absolute values of the horizontal and vertical displacements for an initial vertex are both equal to or smaller than the corresponding dynamic ranges, respectively, the second comparison block 164 sets the initial vertex as a relative vertex and generates a first selection signal to the selector 166. If, however, a magnitude of any of the two displacements $D_H(i)$ and the $D_V(i)$ is larger than the corresponding dynamic ranges, the second comparison block 164 sets the initial vertex as an absolute vertex and provides the selector 166 with a second selection signal.

The selector 166 provides the displacements $D_H(i)$ and the $D_V(i)$ to the displacement coding block 170 if the first selection signal is inputted thereto; and transfers the absolute addresses, i.e., $ADD_H(i)$ and $ADD_V(i)$, to the escape coding block 168 in response to the second selection signal. In other words, the selector 166 selectively provides the relative and absolute vertices to the displacement coding block 170 and the escape coding block 168 in response to the first and the second selection signals, respectively. For the exemplary initial vertices shown in FIG. 3, if the vertices are provided by the grouping block 158 in an order of I1 to I11, I13 and I12, transferred to the escape coding block 168 are first vertices, I1, I2, I6, of the groups A, B and C and a first vertex I13 of a branch in the group C. Those vertices I1, I2, I6 and I13 are absolute vertices because the I1 is the first vertex outputted from the grouping block 158 and the subsequent vertices, I2, I6 and I3, are all disposed outside the dynamic regions thereof, respectively.

The escape coding block 168 encodes the position information of each absolute vertex inputted thereto by using a predetermined escape code, wherein the escape code indicates that a codeword appearing thereafter is an encoded absolute address. For example, upon receiving horizontal and vertical addresses of an absolute vertex, e.g., I2, the escape coding block 168 produces the escape code followed by the encoded horizontal and vertical absolute addresses of the vertex I2. Escape-coded data from the escape coding block 168 is fed to the MUX 180 shown in FIG. 1, the escape-coded data including the escape code and the encoded horizontal and vertical address of each absolute vertex.

The displacement coding block 170 encodes the horizontal and the vertical displacements of the relative vertices conveyed thereto from the selector 166 by using the number of bits assigned by the dynamic range calculation block 160 to thereby send encoded relative vertex data for each relative vertex to the MUX 180. For instance, if the horizontal and the vertical dynamic range bits determined by the dynamic range calculation block 160 are 5 and 4, respectively, the displacement coding block 170 generates first horizontal and vertical range bit data representing respective dynamic range bits and then encodes the displacement for each relative vertex by using the horizontal and the vertical dynamic range bits. In a preferred embodiment of the present invention, each of the horizontal and the vertical range bit data is represented in 3 bits. The range bit data and the encoded displacement data for the relative vertices are transferred to the MUX 180.

In another preferred embodiment of the invention, the grouping block 158 may be changed to append to each initial vertex a group index indicating the group the initial vertex belongs to. And then the grouping block 158 sends the absolute addresses of each initial vertex to the displacement calculation block 162. The displacement calculation block 162 may be modified to directly provide the displacements to the displacement coding block 170. In this embodiment, the second comparison block 164 and the selector 166 are not needed. The displacement calculation block 162 sends the absolute addresses of a first initial vertex in each group to the escape coding block 168 and transmits displacements for the subsequent initial vertices in each group to the displacement coding block 170. In such an instance, if a group includes a branch as in the case of group C in FIG. 3, the grouping block 158 also issues reference vertex information for a first initial vertex in a second branch. For example, if the vertices in the group C are outputted from the grouping block 158 in the order of I6 to I11, the vertices I12 and I13 are outputted to the displacement calculation block 162 in that order with the reference vertex information attached to the I12 indicating that the reference vertex of the first initial vertex I12 of the second branch is I8. Based on the reference vertex information, the displacement calculation block 162 provides the displacement data of the vertex I12 obtained with respect to the branch vertex I8.

In short, if the number of contours in an image frame is less than the predetermined number, all the absolute addresses of the initial vertices of the contours are encoded at the absolute address coding block 156 and are transmitted as the encoded initial vertex data to the MUX 180. However, if the number of the contours are greater than or equal to the predetermined number, the contours are divided into a plurality of groups, wherein if a position of an initial vertex in a group is known, relative displacements of all the other vertices in the group with respect to the initial vertex can be represented by dynamic ranges determined by the number of the contours. Thereafter, absolute position information of a first initial vertex in each group is encoded at the escape coding block 168 and all the remaining initial vertices are encoded at the displacement coding block 170 based on their displacements and the dynamic ranges. The escape-coded data and the displacement coded data are provided as the encoded initial vertex data to the MUX 180. At the MUX 180, the encoded non-initial vertex data from the vertex coding block 140 and the encoded initial vertex data from the initial vertex coding block 150 are multiplexed into the coded contour data and are transmitted to the transmitter(not shown) for the transmission thereof.

While the present invention has been described with respect to certain preferred embodiments only, other modifications and variations can be made without departing from the spirit and scope of the present invention as set forth in the following claims.

What is claimed is:

1. A method for encoding an image frame including L objects in an input image signal, L being a non-negative integer, comprising the steps of:

(a) extracting L contours of the L objects;

(b) selecting a set of vertices which fits each contour;

(c) determining an initial vertex of each contour in said set of vertices;

(d) grouping the L contours into at most L groups of contours according to a predetermined criterion;

(e) selecting a first initial vertex among the initial vertices of the contours included in each group of contours;

(f) encoding absolute addresses of the first initial vertices of all the groups of contours, the absolute address of a vertex representing position of the vertex in the image frame;

(g) encoding displacements of the rest of the initial vertices for all the group of contours, wherein a displacement of an initial vertex is calculated with respect to a preceding initial vertex; and (h) rendering the encoded absolute addresses and the displacements as encoded initial vertex data.

2. The method according to claim 1, wherein the step (d) includes the steps of:

(d1) finding horizontal and vertical dynamic ranges, $DR_H$ and $DR_V$, which determine horizontal and vertical dynamic range bits, the number of bits required at the encoding step (g);

(d2) deciding a dynamic region for each initial vertex based on the $DR_H$ and $DR_V$; and (d3) grouping together the contours whose dynamic regions are overlapping or contiguous to each other, wherein two of the dynamic regions in a group form one overlapped region and none of the dynamic regions in a group overlap with any dynamic region of an initial vertex belonging to another group.

3. The method according to claim 2, wherein the step (d1) has the steps of:

dividing horizontal and vertical sizes of the frame $FS_H$ and $FS_V$ by the number of contours L; and if $FS_H/L$ and $FS_V/L$ are equal to or greater than $2^M$ and $2^N$ but smaller than $2^{M+1}$ and $2^{N+1}$ respectively, setting the horizontal and the vertical dynamic ranges, $DR_H$ and $DR_V$, as $2^{M+1}-1$ and $2^{N+1}-1$, M and N being non-negative integers.

4. The method according to claim 3, wherein the horizontal and the vertical dynamic range bits are set as M+1 and N+1, respectively.

5. The method according to claim 4, wherein the dynamic region of the initial vertex is obtained by forming a rectangle whose central point coincides with the initial vertex itself and whose horizontal and vertical lengths equal to the horizontal and the vertical dynamic ranges, $DR_H$ and $DR_V$, respectively.

6. The method according to claim 5, wherein the step (e) includes the steps of:

finding among the group of initial vertices one which has only one neighboring initial vertex connected thereto via the dynamic region thereof;

setting said initial vertex as the first initial vertex for the group; and repeating the above procedure for all the groups of initial vertices.

7. The method according to claim 6, wherein the displacement of the i-th initial vertex of the L contours consists of horizontal and vertical displacements, $D_H(i)$ and $D_V(i)$, i being a positive integer from 1 to L, which are defined as:

$$D_H(i) = ADD_H(i) - ADD_H(i-1)$$
$$D_V(i) = ADD_V(i) - ADD_V(i-1),$$

wherein $ADD_H(i)$ and $ADD_V(i)$ are horizontal and vertical addresses of the i-th initial vertex, respectively, and $ADD_H(0)$ and $ADD_V(0)$ are preset initial values having such large values that generate $D_H(1)$ and $D_V(1)$ whose absolute values are greater than any possible horizontal and vertical dynamic ranges, respectively, the horizontal and the vertical addresses of the i-th initial vertex representing horizontal and vertical position of the i-th initial vertex in the image frame, respectively.

8. The method according to claim 7, wherein the step (h) includes the steps of:

multiplexing the encoded absolute addresses of the first initial vertex of each group of contours with the encoded displacements of the rest of the initial vertices within said each group to thereby provide encoded initial vertex data for said each group of initial vertices; and outputting the encoded initial vertex data of each group of initial vertices on a group-by-group basis.

9. A method encoding initial vertices of contours within a frame, wherein absolute addresses of the initial vertices are inputted, to thereby provide encoded initial vertices, the absolute address of the initial vertex representing positions of the initial vertex in the frame, comprising the steps of:

(a) comparing the number of initial vertices with a predetermined number;

(b) if the number of initial vertices are smaller than a predetermined number, encoding horizontal and vertical absolute addresses of the initial vertices, wherein the horizontal and the vertical absolute addresses of the initial vertex represent horizontal and vertical position of the initial vertex in the frame, and if otherwise, executing step (c); and (c) selectively executing either escape coding or displacement coding in response to a selection signal; wherein the step) (c) includes the steps of:

(c1) calculating horizontal and vertical dynamic ranges of the frame to thereby provide a dynamic region of each initial vertex, and allocating horizontal and vertical dynamic range bits for step (c4);

(c2) grouping the initial vertices whose dynamic regions are overlapping or contiguous to each other and then sequentially arranging the initial vertices in a group to provide them one at a time in the group and then on a group-by-group basis, to be used thereafter;

(c3) if an initial vertex provided at the step (c2) belongs to a same group as an immediately preceding one, calculating horizontal and vertical displacements between the two initial vertices and then issuing a selection signal for displacement coding, and if otherwise, issuing a selection signal for escape coding;

(c4) in response to the selection signal for the displacement signal, encoding the horizontal and vertical displacements of the initial vertex calculated at step (c3) in the horizontal and vertical dynamic range bits calculated in step (c1); and (c5) in response to the selection signal for the escape coding, sending out an escape code and then encoding the horizontal and the vertical absolute addresses of the initial vertex.

10. The method according to claim 9, wherein the step (c1) has the steps of:

dividing horizontal and vertical sizes of the frame $FS_H$ and $FS_V$ by the number of contours L;

if $FS_H/L$ and $FS_V/L$ are equal to or greater than $2^M$ and $2^N$ but smaller than $2^{M+1}$ and $2^{N+1}$, respectively, setting the horizontal and the vertical dynamic ranges, $DR_H$ and $DR_V$, as $2^{M+1}-1$ and $2^{N+1}-1$, respectively, both M and N being non-negative integers;

determining the dynamic region of each initial vertex by forming a rectangle whose center point coincides with the initial vertex itself and whose horizontal and vertical lengths equal to the horizontal and vertical dynamic ranges, $DR_H$ and $DR_V$, respectively; and setting the horizontal and vertical dynamic range bits as M+1 and N+1, respectively.

11. The method according to claim 10, wherein the horizontal and the vertical displacements $D_H(i)$ and $D_V(i)$ for the i-th initial vertex of the L contours, i being a positive integer from 1 to L, are defined as:

$$D_H(i)=ADD_H(i)-ADD_H(i-1)$$

$$D_V(i)=ADD_V(i)-ADD_V(i-1)$$

wherein $ADD_H(i)$ and $ADD_V(i)$ are horizontal and vertical addresses of the i-th initial vertex and the $ADD_H(0)$ and $ADD_V(0)$ are preset initial values having such large values that generate $D_H(1)$ and $D_V(1)$ whose absolute values are greater than any possible horizontal and vertical dynamic ranges, respectively.

12. The method according to claim 11, wherein the escape code produced in step (c5) has horizontal and vertical escape codes which are largest values possible to represent in the horizontal and vertical dynamic range bits, respectively.

13. An apparatus for encoding initial vertices of a plural number of contours within an image frame of an input image signal, wherein the initial vertex is one of a set of vertices representing a contour, comprising:

means for comparing number of initial vertices with a predetermined number;

means for encoding absolute addresses of the initial vertices if the number of initial vertices is smaller than the predetermined number;

means for calculating a horizontal and vertical dynamic ranges of the frame;

means for obtaining a dynamic region of each initial vertex to thereby group the initial vertices having overlapping or contiguous dynamic regions together;

means for providing the initial vertices one at a time in a group and on a group-by-group basis;

means for transferring the initial vertex if it is in a different group from the immediately preceding one from said providing means to an escape coding means, and if otherwise, to a displacement coding means;

means for escape coding the initial vertex;

means for coding the displacement of the initial vertex from the immediately preceding initial vertex; and means for rendering the escape coded initial vertices and the displacement coded initial vertices as encoded initial vertex data.

14. The apparatus according to claim 13, wherein the means for calculating the horizontal and vertical dynamic ranges of the frame, $DR_H$ and $DR_V$, includes:

means for dividing horizontal and vertical sizes of the frame $FS_H$ and $FS_V$ by the number of contours L, L being a non-negative integer; and means for, if $FS_H/L$ and $FS_V/L$ are equal to or greater than $2^M$ and $2^N$ but smaller than $2^{M+1}$ and $2^{N+1}$, respectively, setting the horizontal and the vertical dynamic ranges, $DR_H$ and $DR_V$, as $2^{M+1}-1$ and $2^{N+1}-1$, M and N being non-negative integers.

15. The apparatus according to claim 14, wherein the dynamic region of each initial vertex is obtained by forming a rectangle whose central point coincides with the initial vertex itself and whose horizontal and vertical lengths equal to the horizontal and the vertical dynamic ranges, $DR_H$ and $DR_V$, respectively.

16. The apparatus according to claim 15, wherein the means for escape coding the initial vertex includes means for producing a horizontal and vertical escape codes; and means for encoding the horizontal and vertical absolute addresses of the initial vertex.

17. The apparatus according to claim 16, wherein the means for coding displacement includes:

means for calculating horizontal and vertical displacements of the initial vertex provided i-th from the providing means, i being an integer from 1 to L;

means for allocating M+1 and N+1 bits for encoding the horizontal and vertical displacements, respectively; and means for encoding the horizontal and vertical displacements of the initial vertex.

18. The apparatus according to claim 17, wherein the horizontal and vertical displacements of the i-th initial vertex $D_H(i)$ and vertical displacement $D_V(i)$ is defined as:

$$D_H(i) = ADD_H(i) - ADD_H(i-1)$$

$$D_V(i) = ADD_V(i) - ADD_V(i-1)$$

wherein the $ADD_H(0)$ and $ADD_V(0)$ are preset initial values having such large values that generate $D_H(1)$ and $D_V(1)$ whose absolute values are greater than any possible horizontal and vertical dynamic ranges.

19. The apparatus according to claim 18, wherein the horizontal and vertical escape code are the largest values possible to represent in M+1 and N+1 bits, respectively.

20. The apparatus according to claim 19, wherein the means for rendering the encoded initial vertex data includes:

means for multiplexing the encoded absolute addresses of the first initial vertex of the group with the encoded displacements of the rest of the initial vertices within the group to thereby provide encoded initial vertex data for each group of initial vertices; and means for outputting the encoded initial vertex data of each group of initial vertices on a group-by-group basis.

* * * * *